United States Patent [19]

Urzi

[11] 4,192,257
[45] Mar. 11, 1980

[54] SUSPENSION-TYPE POULTRY DRINKING APPARATUS

[75] Inventor: Santi T. Urzi, Johannesburg, South Africa

[73] Assignee: Custom Moulders (Proprietary) Limited, Johannesburg, South Africa

[21] Appl. No.: 869,127

[22] Filed: Jan. 13, 1978

[30] Foreign Application Priority Data

Jan. 13, 1977 [ZA] South Africa .................. 77/0168

[51] Int. Cl.² ..................................... A01K 7/00
[52] U.S. Cl. ................................................ 119/81
[58] Field of Search .................... 119/81, 75, 72.5

[56] References Cited

U.S. PATENT DOCUMENTS

| 2,632,463 | 3/1953 | Martin | 119/81 |
| 3,307,522 | 3/1967 | Far | 119/81 |
| 3,590,782 | 7/1971 | Kantor | 119/81 |

FOREIGN PATENT DOCUMENTS

| 959417 | 3/1957 | Fed. Rep. of Germany | 119/81 |
| 1059204 | 7/1959 | Fed. Rep. of Germany | 119/81 |

Primary Examiner—Jay N. Eskovitz
Attorney, Agent, or Firm—Young & Thompson

[57] ABSTRACT

Suspension-type poultry drinking apparatus comprising a rigid, elongated hanger; a drinking vessel; means resiliently mounting the drinking vessel in suspension on the hanger to permit the vessel to move up and down according to the weight of water in the vessel; and an inlet valve for controlling a supply of water to the drinking vessel, the valve being resiliently biassed towards a closed position and being adapted to be opened when the drinking vessel rises with a decrease in the supply of water therein, characterized by valve mounting means on the hanger which is adapted to mount the inlet valve on the hanger in a position off-set laterally from the axis of the hanger.

13 Claims, 1 Drawing Figure

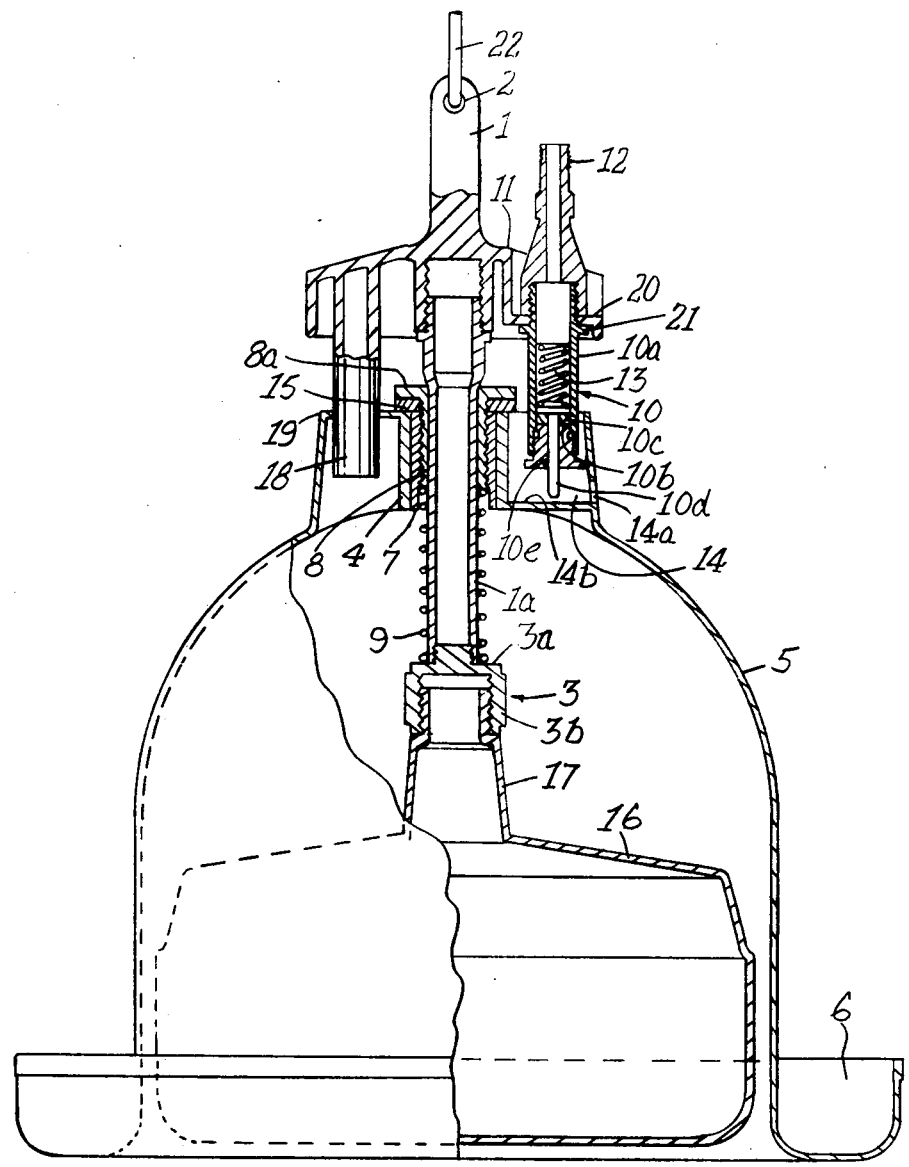

SUSPENSION-TYPE POULTRY DRINKING APPARATUS

This invention relates to suspension-type poultry drinking apparatus of the kind comprising a rigid, elongated hanger; a drinking vessel; means resiliently mounting the drinking vessel in suspension on the hanger to permit the vessel to move up and down according to the weight of water in the vessel; and an inlet valve for controlling a supply of water to the drinking vessel, the valve being resiliently biassed towards a closed position and being adapted to be opened when the drinking vessel rises with a decrease in the supply of water therein.

For the purpose of this specification poultry drinking apparatus as defined above will hereinafter be referred to as "poultry drinking apparatus of the kind in question."

Poultry drinking apparatus of the kind in question is well known but as far as applicants are aware most, if not all, the known arrangements suffer from one or other disadvantage. For example, in a known type of apparatus it is not possible to clean or repair the inlet valve without disturbing the resilient mounting of the drinking vessel on the hanger and thereby affecting the sensitivity of operation of the water inlet valve. Also, there is a tendency for a drinking vessel which is supported in freely swinging suspension by a freely swinging hanger, to swing about during use when poultry drink therefrom.

Suggestions have been made for avoiding this problem but the suggestions known to applications either affect the resilient mounting of the vessel on the hanger and thereby the sensitivity of operation of the water inlet valve, or involve a relatively complicated and expensive construction.

It is an object of the present invention to provide improved poultry drinking apparatus with which the above disadvantages may be avoided or at least minimised.

According to the invention suspension type drinking apparatus of the kind in question is characterised by valve mounting means on the hanger which is adapted to mount the inlet valve on the hanger in a position off-set laterally from the axis of the hanger.

The valve mounting means may be adapted to mount the inlet valve in laterally spaced relationship to the hanger.

The valve mounting means may comprise a bracket or carrier extending laterally from the hanger.

The inlet valve may be detachably mountable on the valve mounting means.

The drinking vessel may comprise an annular trough carried at the lower region of a bell-shaped member which is mounted in suspension on the hanger by the resilient mounting means, the inlet valve being mountable above the bell-shaped member and being operable by an upper region of the bell-shaped member. Water passing through the valve may flow down the outer surface of the bell-shaped member into the water trough.

The bell-shaped member may include a water chamber adapted to receive water passing through the inlet valve; and an outlet from the water chamber leading to the outer surface of the bell-shaped member.

The water chamber may be located below the valve mounting means.

The inlet valve may include a valve seat; a movable closure member resiliently biassed into engagement with the valve seat; and a valve stem on the closure member which is engageable by a contact surface in the upper region of the bell-shaped member to displace the closure member away from the seat upon upward movement of the bell-shaped member under the influence of its resilient mounting on the hanger when the weight of water in the annular trough drops below a predetermined value.

The valve components may be located in a housing adapted to be mounted, preferably detachably, on the valve mounting means.

The arrangement according to the invention permits a simplification in the construction of the apparatus and also allows for the maintenance and/or replacement of the inlet valve without disturbance of the resilient mounting of the drinking vessel on the hanger.

Furthermore, the arrangement according to the invention allows for the mounting of a stabilizing weight directly on the hanger in a simple manner without influencing the resilient mounting of the drinking vessel on the hanger so that the sensitivity of operation of the inlet valve is not affected.

Thus, the drinking apparatus may include weight mounting means attached directly to the hanger below the resilient mounting of the drinking vessel on the hanger.

The arrangement of the previous paragraph permits a relatively simple, cheap and robust mounting of the stabilizing weight directly on the hanger.

The weight mounting means may be attached to the lower end of an elongated hanger adapted to be suspended in freely swinging manner in upright position above ground level.

The weight mounting means may be in screw threaded engagement with the hanger.

The weight mounting means may be adapted releasably to be engaged in any suitable manner by a stabilizing weight. Thus, the weight mounting means may include a screw threaded socket or spigot adapted to be engaged by a complementary screw threaded formation on the stabilizing weight.

The stabilizing weight may comprise a container for liquid or other flowable material, the container including a filler spout adapted to be suspended from the hanger by means of a screw threaded engagement with the weight mounting means.

Where the drinking vessel comprises an annular trough carried at the lower region of a bell-shaped member which is mounted in suspension on the hanger by the resilient mounting means, the weight mounting means may be locatable within the bell-shaped member.

Where the stabilizing weight includes a flowable material container, the latter may also be locatable within the bell-shaped member.

For a clear understanding of the invention a preferred embodiment will now be described purely by way of example with reference to the accompanying drawing which is a vertical sectional view of drinking apparatus according to the invention.

The apparatus comprises rigid, elongated hanger 1 which is provided with an aperture 2 at its upper end to permit it to be suspended from any suitable support by any suitable means, such as a flexible cord, rope or like element 22. Weight mounting means 3 is attached directly to hanger 1 at its lower end with a screw threaded engagement.

Hanger 1 passes through a bore in neck 4 which is centrally located on the upper end of a bell-shaped member 5 which defines annular drinking trough 6 round its lower region. Internally threaded liner 7 is located with a tight friction fit within the bore in neck 4. Externally threaded sleeve 8 is in screw threaded engagement with liner 7 and presents a smooth bore which slidably embraces the stem 1a of hanger 1 so that bell-shaped member 5 is movable up and down along stem 1a.

Compression spring 9 is located between the lower end of sleeve 8 in neck 4 of bell-shaped member 5 and the shoulder 3a of weight mounting means 3 which is attached directly to the lower end of hanger 1. Spring 9 acts resiliently to urge bell-shaped member 5 upwardly along hanger 1, but bell-shaped member 5 can move downwardly along hanger 1 against the action of spring 9 under the weight of water in drinking trough 6. Bell-shaped member 5 and therefore drinking trough 6 are resiliently mounted in suspension on hanger 1 by means of spring 9 to permit member 5 and trough 6 to move up and down along hanger 1 in accordance with the weight of water in trough 6.

Inlet valve 10 for controlling a supply of water to drinking trough 6 is detachably mounted on carrier 11 which is fast with hanger 1 towards the upper end thereof and extends laterally from hanger 1. Inlet valve 10 is laterally spaced from hanger 1 and from its longitudinal axis. Inlet valve 10 comprises casing 10a communicating with water inlet 12; valve seat 10b; movable closure member 10c which is resiliently urged into engagement with seat 10b by compression spring 13; and valve stem 10d on closure member 10c. Valve stem 10d is located with a clearance in outlet passage 10e from casing 10a and projects downwardly from casing 10a into water chamber 14 defined on the upper end of bell-shaped member 5. Outlet port 14a is provided to permit water to run out from chamber 14 over the outer periphery of bell-shaped member 5 and into drinking trough 6.

In use, hanger 1 may be suspended in freely swinging manner from an overhead support by means of flexible element 22 to support trough 6 in freely swinging suspension above ground level.

Inlet 12 is connected to a water supply. When there is no water in drinking trough 6, spring 9 urges bell-shaped member 5 upwardly so that the base 14b of water chamber 14 engages valve stem 10d and urges closure member 10c upwardly away from valve seat 10b against the action of biassing spring 13, thereby to permit water to flow from inlet 12, through valve 10, into water chamber 14, through port 14a, down the outer periphery of bell-shaped member 5 and into drinking trough 6. As the weight of water in trough 6 increases, bell-shaped member 5 moves downwardly against the action of spring 9, thereby to permit biassing spring 13 to urge closure member 10c back towards valve seat 10b until closure member 10c engages seat 10b to shut off the supply of water to trough 6. When the supply of water in trough 6 decreases, spring 9 re-exerts itself to urge bell-shaped member 5 upwardly again until closure member 10c is again lifted from valve seat 10b to permit a flow of water to trough 6. It will be appreciated that the supply of water to trough 6 is controlled automatically in accordance with the supply of water in trough 6.

The sensitivity of the rise and fall of bell-shaped member 5 and therefore the sensitivity of operation of inlet valve 10 may be adjusted by screwing sleeve 8 into or out of liner 7 by manipulation of flange 8a on sleeve 8, thereby to vary the distance between the lower end of sleeve 8 and shoulder 3a on weight mounting means 3 which present end stops for spring 9. Lock nut 15 is provided on sleeve 8 to lock it in position.

To minimise swinging of drinking trough 6 during use, a stabilizing weight may be suspended directly from the lower end of hanger 1 by means of weight mounting means 3. Liquid container 16 which is provided with an externally threaded filler spout 17 is adapted to be screwed into engagement with a complementary, internally threaded socket 3b in the lower end of weight mounting means 3 which is attached directly to hanger 1 at the lower end thereof. Container 16 is locatable within bell-shaped member 5 and may be filled with a suitable quantity of water, sand or other flowable material to provide a suitable stabilizing weight which is suspended from the lower end of hanger 1.

It will be appreciated that the stabilizing weight is carried directly by hanger 1 independently of spring 9 which resiliently mounts bell-shaped member 5 on hanger 1. The stabilizing weight does not, therefore, affect the sensitivity of operation of inlet valve 10 since vertical movement of bell-shaped member 5 along hanger 1 is not influenced by the presence of the stabilizing weight. It will also be appreciated that the attachment of the stabilizing weight to the lower end of hanger 1 in a position below the resilient mounting of bell-shaped member 5 on hanger 1, is of simple and robust construction.

Since the stabilizing weight is mountable on the lower end of hanger 1, it has a maximum stabilizing effect on the suspended apparatus.

The location of inlet valve 10 in a postion laterally spaced from hanger 1 has the advantage that the lower end of hanger 1 may extend into the interior of bell-shaped member 5 to permit weight mounting means 3 of simple and robust construction to be attached directly to the lower end of hanger 1 and independently of spring 9 in a position within the interior of bell-shaped member 5. Furthermore, inlet valve 10 may be cleaned and/or repaired and/or replaced without disturbing the setting of sleeve 8 relative to liner 7 which controls the sensitivity of operation of inlet valve 10.

It will be seen from the drawing that the upper end of valve casing 10a passes through an aperture in mounting portion 20 of carrier 11 and is in screw threaded engagement with the lower end of water inlet 12, mounting portion 20 being clamped between the lower end of water inlet 12 and flange 21 on valve casing 10a. Inlet valve 10 is a self-contained unit within its casing 10a and may be removed for maintenance or replacement simply by unscrewing water inlet 12 from the threaded upper end of valve casing 10a and withdrawing valve casing 10a downwardly from carrier 11.

It will be appreciated that many variations in detail are possible without departing from the spirit of the invention. For example, in order to guide the bell-shaped member 5 for smooth up and down movement relative to hanger 1 without it turning about the stem 1a of hanger 1, there may be provided a guide element 18 on the upper region of hanger 1 which is slidably movable through a complementary aperture in guide formation 19 fast with the upper end of bell-shaped member 5.

Any suitable stabilizing weight other than container 16 may be attached to weight mounting 3. It is possible for weight mounting means 3 and liquid container 16 to be omitted altogether. In that case, mounting means 3 may be replaced by a screw threaded plug engaging the lower end of hanger 1 and including a flange presenting a shoulder 3a to seat spring 9, but which does not include a threaded socket portion 3b adapted to engage a container 16 or other stabilizing weight.

I claim:

1. Suspension-type poultry drinking apparatus comprising a rigid, elongated hanger adapted to be suspended in freely swinging manner in upright position above ground level; a drinking vessel; mounting means movable longitudinally along the hanger and operative resiliently to mount the drinking vessel in suspension on the hanger to permit the vessel to move up and down relative to the hanger according to the weight of water in the vessel; and an inlet valve for controlling a supply of water to the drinking vessel, the valve including a closure member movable longitudinally relative to the hanger, the closure member being resiliently biassed towards a closed position and being adapted to be opened when the drinking vessel rises with a decrease in the supply of water therein, characterised by valve mounting means on the hanger which is adapted to mount the inlet valve on the hanger in a position off-set laterally from the axis of the hanger.

2. Poultry drinking apparatus as claimed in claim 1, wherein the valve mounting means comprising a bracket or carrier extending laterally from the hanger.

3. Poultry drinking apparatus as claimed in claim 1, wherein the inlet valve is detachably mountable on the valve mounting means.

4. Poultry drinking apparatus as claimed in claim 1, including weight mounting means attached directly to the hanger below the resilient mounting of the drinking vessel on the hanger.

5. Poultry drinking apparatus as claimed in claim 4, wherein the weight mounting means is attached to the lower end of an elongated hanger adapted to be suspended in freely swinging manner in upright position above ground level.

6. Poultry drinking apparatus as claimed in claim 4, wherein the weight mounting means is in screw threaded engagement with the hanger.

7. Poultry drinking apparatus as claimed in claim 4, wherein the weight mounting means includes a screw threaded formation adapted to be engaged by a complementary screw threaded formation on a stabilizing weight.

8. Poultry drinking apparatus as claimed in claim 4, including a stabilizing weight on the weight mounting means.

9. Suspension-type poultry drinking apparatus comprising a rigid, elongated hanger; a drinking vessel; means resiliently mounting the drinking vessel in suspension on the hanger to permit the vessel to move up and down according to the weight of water in the vessel; and an inlet valve for controlling a supply of water to the drinking vessel, the valve being resiliently biassed towards a closed position and being adapted to be opened when the drinking vessel rises with a decrease in the supply of water therein, characterised by valve mounting means on the hanger which is adapted to mount the inlet valve on the hanger in a position off-set laterally from the axis of the hanger, the drinking vessel comprising an annular trough carried at the lower region of a bell-shaped member which is mounted in suspension on the hanger by the resilient mounting means, the inlet valve being mountable above the bell-shaped member and being operable by an upper region of the bell-shaped member.

10. Poultry drinking apparatus as claimed in claim 9, wherein the bell-shaped member includes a water chamber adapted to receive water passing through the inlet valve; and an outlet from the water chamber leading to the outer surface of the bell-shaped member to permit water to flow down the outer surface of the bell-shaped member into the water trough.

11. Poultry drinking apparatus as claimed in claim 9, wherein the inlet valve includes a valve seat; a movable closure member resiliently biassed into engagement with the valve seat; and a valve stem on the closure member which is engageable by a contact surface in the upper region of the bell-shaped member to displace the closure member away from the seat upon upward movement of the bell-shaped member under the influence of its resilient mounting on the hanger when the weight of water in the annular trough drops below a predetermined value.

12. Poultry drinking apparatus as claimed in claim 11, wherein the valve components are located in a housing adapted to be detachably mounted on the valve mounting means.

13. Poultry drinking apparatus as claimed in claim 9, including weight mounting means attached directly to the hanger below the resilient mounting of the drinking vessel on the hanger and located within the bell-shaped member.

* * * * *